United States Patent

[11] 3,548,115

[72] Inventors Gordon George Scarrott
Welwyn Garden City;
Norman Nathan Truman, Enfield, England

[21] Appl. No. 768,730
[22] Filed Oct. 18, 1968
[45] Patented Dec. 15, 1970

[73] Assignee International Computers Limited
London, England
a British company

[32] Priority Nov. 21, 1967
[33] Great Britain
[31] No. 52794/67

[54] MAGNETIC HEAD WITH CONDUCTIVE GAP SPACER
4 Claims, 2 Drawing Figs.

[52] U.S. Cl. ........ 179/100.2; 340/174.1; 346/74
[51] Int. Cl. ........ G11b 5/12, G11b 5/20
[50] Field of Search ........ 179/100.2C; 346/74MC; 340/174.1F

[56] References Cited

UNITED STATES PATENTS

| | | | |
|---|---|---|---|
| 2,536,272 | 1/1951 | Friend | 179/100.2 |
| 2,539,400 | 1/1951 | Camras | 179/100.2 |
| 2,585,065 | 2/1952 | Weigand | 179/100.2 |
| 2,655,561 | 10/1953 | Connell | 179/100.2 |
| 2,658,114 | 11/1953 | Buhrendorf | 179/100.2 |
| 2,694,109 | 11/1954 | Weigand | 179/100.2 |
| 2,863,002 | 12/1958 | Brower | 340/174.1 |
| 2,927,163 | 3/1960 | Brower | 179/100.2 |
| 2,931,691 | 4/1960 | Curtis et al. | 340/174.1 |
| 2,941,045 | 6/1960 | Connell | 179/100.2 |
| 3,124,788 | 3/1964 | Ricketts et al. | 340/174.1 |

*Primary Examiner*—Bernard Konick
*Assistant Examiner*—William F. White
*Attorney*—Hane and Baxley

ABSTRACT: A magnetic head is described in which a single conductor is arranged at a working surface so that, in use, it lies across a track in a magnetic recording medium, such as magnetic tape, for example. In writing information on to the medium the conductor is energized by an electric current, while in reading previously recorded information, variations in the magnetic field produced as the medium is moved past the head produce corresponding variations in current in the conductor. In order to couple the head to external apparatus a matching transformer is used, and in order to increase the efficiency of the head the transformer has one winding formed integrally with the head. The conductor of the head is connected across a low inductance parallel lead arrangement which is formed into a single-turn winding on the transformer. The efficiency of the arrangement is further increased by providing ferrite, or other material of high magnetic permeability, adjacent the conductor.

PATENTED DEC 15 1970 3,548,115

INVENTORS
GORDON GEORGE SCARROTT
NORMAN NATHAN TRUMAN
BY
Kane and Baxley
ATTORNEYS

MAGNETIC HEAD WITH CONDUCTIVE GAP SPACER

BACKGROUND OF THE INVENTION

1. Field of the Invention

The present invention relates to magnetic heads primarily for use in connection with magnetic information recording systems and to methods of manufacture of such heads.

2. Description of the Prior Art

It has previously been proposed to use magnetic heads for reading and writing information on a magnetic recording medium, such as, for example, a magnetic recording tape. Conventional magnetic heads have a magnetic circuit which is interrupted to form a recording gap, and this gap is aligned across a recording track which is swept out on the recording medium by relative movement between the medium and the head. In order to write information on to the medium, electrical signals are applied to a winding coupled to the magnetic circuit of the head to produce a corresponding variation of magnetic flux in the vicinity of the recording gap, the flux variation producing, in turn, a corresponding variation in the remanent magnetic state of the recording medium along the track. In reading previously recorded information the magnetic variation along the track acts on the magnetic circuit of the head to induce output electrical signals in the windings. It has also been proposed to use a somewhat different recording head in which a single conductor is aligned across the track, the external magnetic field produced by a signal applied to the conductor acting on the recording medium to write information on the head, while in reading the variation of magnetic state of the medium induces a signal into the conductor. It will be realised that the remanent magnetic variations on the recording medium are extremely small and difficulty is experienced in practice in providing a magnetic head of great enough efficiency to produce an output signal in which the required information can readily be distinguished from random "noise" signals. Moreover, in order to record information in a recording system capable of achieving a high information signal density on the recording medium, the magnetic head is required to be very small and it is difficult to use conventional components such as a matching transformer in association with the head, since the connecting leads which then require to be provided themselves seriously attenuate or distort the information signals.

SUMMARY

In order to provide a magnetic head of high efficiency, so that both recording of information on a narrow track with a high information packing density, and reading of prerecorded information at a similar density may be performed without significant loss of information as reviewed in the foregoing paragraph, a sensing head according to the present invention includes a member of electrically conductive material formed in a configuration having two elongate limbs each having a longitudinal axis, one end of each of the limbs lying in a common plane, both limbs extending in the same direction from said common plane and being positioned substantially parallel to one another over the greater part of their lengths; an electrically conductive path looping together those ends of the limbs remote from said common plane; a member of high magnetic permeability positioned between said one ends of the limbs; a thin layer of electrically conductive material connecting said one ends of the limbs, lying in a plane parallel to said longitudinal axes, one edge of the thin layer lying in said common plane; a structure of high magnetic permeability forming a closed magnetic circuit coupled to said conductive path; and a winding closely magnetically coupled to said structure.

The magnetic head may have the limbs and the looping path formed from a single conductive strip, the looping path forming a single turn about part of a transformer core formed by the structure of high magnetic permeability. Alternatively the limbs may be formed as mutually insulated conductive layers on an elongated member of high magnetic permeability, the layers being formed into a loop about one end of the elongate member.

DESCRIPTION OF PREFERRED EMBODIMENTS

Figure 1:
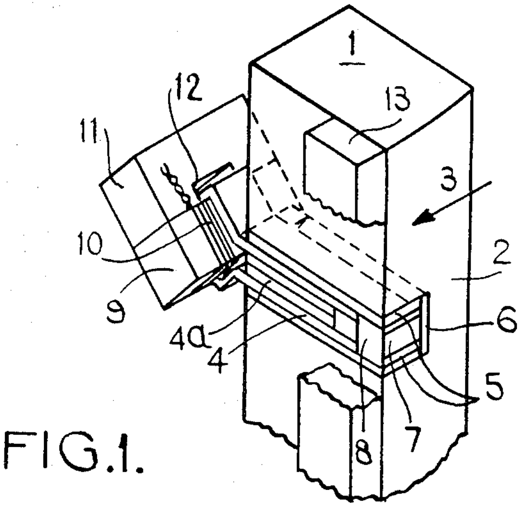
FIG. 1 shows a magnetic head structure.

FIG. 1 shows a magnetic head structure mounted in a brass head block 1. The front face 2 of the block is curved to facilitate the passage of magnetic tape (not shown) across the head in the direction indicated by arrow 3. A thin flat strip 4 of a material, such as silver, which has a high electrical conductivity, is formed into an open ended loop, the loop having two parallel limb portions terminating at the face 2, the limbs being looped together at a point remote from the face 2. The conductor 4 is insulated from the brass block 1, by thin strips 5 and 6 of an insulator, such as mica. A block 7 of nonconducting material of high magnetic permeability, such as a magnetic ferrite, is positioned between the limbs of the conductor 4 at the open end. The remaining space between the parallel part of the limbs is filled with a further conductive strip 4*a* and another mica strip. A further strip conductor 8 joins the open end of the limbs of the conductor 4, at one side of the conductor 4. The conductor 8 may be a thin layer of gold produced by vacuum deposition and/or plating.

A block 9 of ferrite, or other high permeability magnetic material, is embraced by the loop portion of the conductor 4, which is shaped to accommodate the block. The block 9 carries a multiturn winding 10. A further block of ferrite 11, which is provided with a recess 12 to accommodate the conductor 4 is butted against the block 9, so that the blocks 9 and 11 together provide a closed magnetic circuit of high permeability.

The head assembly may be considered as consisting of a single turn reading or recording element formed by the strip 8, a low inductance strip transmission line formed by the straight parallel limb portions of the conductor 4 and the strip 4*a*, and a wide band pulse transformer formed by the loop portion of the conductor 4, the winding 10 and the ferrite blocks 9 and 11. The strip 4*a* is connected to one of the straight limb portions of the conductor 4 and thus reduces the effective spacing between the straight portions. This reduces the inductance of the strip transmission line. The thickness of the strip 8 is very small, typically 80—100 microinches. The block 7 serves to concentrate the magnetic field in the vicinity of the front edge of the strip 8. The concentration of the field may be further increased by incorporation of a ferrite block 13 which abuts the outside face of the strip 8. The small dimensions of the strip 8, together with the field concentration which is produced by the ferrite material adjacent to it, enables the head to operate at relatively high efficiency at high packing densities of 10000 pulses per inch, or more.

The inductance and impedance of the strip 8 are very low, but the transmission line formed by the straight limb portions of the conductor provide a low loss connection to the single turn transformer winding which is formed by the loop of the conductor 4. The number of turns on the winding 10 is such that the impedance of the strip 8 is transformed to a value which mates the impedance of conventional transistor read or write circuits. The transformation ratio is typically in the range of 10:1 to 20:1.

The thickness of the strip 8 may be increased if the head is not required to operate at very high packing densities. The strip may then be a piece of gold, or silver, foil, or it may be formed as an extension on one of the limbs which is bent at right angles and joined to the other limb.

The small dimensions of the head in the plane of the surface 2 allow two, or more, similar heads to be accommodated in small space, facilitating the construction of multitrack heads, or of groups of heads which provide separate read, write and erase facilities, for example, in a single track. The field concentration produced by the ferrite material around the strip 8 considerably reduces the risk of stray magnetic coupling between closely spaced heads.

Figure 2:
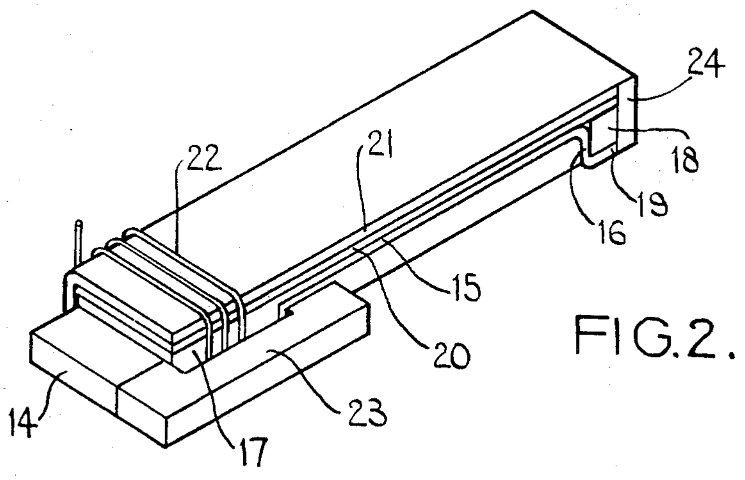
FIG. 2 shows an alternative form of head structure which is particularly suitable for manufacture of thin film deposition techniques.

FIG. 2 shows a modified form of construction which is particularly suited for use with thin film deposition techniques. The body of the head consists of a rectangular ferrite block 14. A first conductor layer 15 is deposited on one face of the block. At the other end of the block 14, the conductor layer 15 is continued partly around the other longitudinal faces of the block 14 as indicated at 17. A second ferrite block 18 is next positioned at that end of the block 14 over which the conductor layer 16 is deposited and is secured in this position, for example, by an epoxy resin adhesive. The layer 16 is continued over an adjacent face of the block 18 by the deposition of the further layer 19 in a plane parallel with that of the main part of the layer 15. The block 18 is approximately the same thickness as the block 14, and a layer of insulation 20 is deposited over the conductor layer 15 on the main block 14 and is continued over the opposite face of the block 18 to that on which the layer 19 is deposited. A further conductive layer 21 is then deposited over the insulating layer 20. At the end of the block 14 remote from the block 18, the conductive layer 21 is continued around the longitudinal faces of the block 14 to join the continuation of the layer 15, and to form jointly with it a loop completely enclosing that end of the block 14 joining together the layers 15 and 21. The loop so formed between these layers thus forms a single turn winding about the block 14, and constitutes a winding of a transformer of which that part of the block 14 about which the loop is formed forms part of the core. Wire is wound round the end of the block 14 over the loop to form the other transformer winding. A closed magnetic circuit for the transformer is formed by a U-shaped ferrite block 23 which is butted against one side of the block 14. The head element itself is formed by a deposited conductive strip 24 which joins the open ends of the layers 21 and 15. A further ferrite block may be positioned against the face of the strip 24, corresponding to the block 13 of FIG. 1.

The conductive layers may be formed by vacuum deposition, or by plating, or by a combination of these processes. The small size of the block 14 may cause difficulties in producing by masking the rather complicated pattern of the layers 15 and 17. It may be more convenient to deposite conductive layers over all sides of the block 15 and to remove unwanted parts of the layers to produce the required final pattern.

It will be appreciated that although the foregoing description has described a head suitable for use in conjunction with a magnetic recording tape system, such a head may also be used with advantage for magnetic drum or disc systems which require to store information items at a high packing density, since the structure consisting of integrally formed transformer, transmission line and recording strip forms a high efficiency head particularly suitable for use in any of such systems.

We claim:

1. A magnetic head including a member of electrically conductive material having two elongated limbs arranged as a low inductance strip transmission line with said limbs being substantially parallel to one another over the greater part of their lengths, one end of each limb lying in a first plane with one side of each limb lying in a second plane normal to said first plane; a ferrite block positioned between said limbs and having first and second sides lying in said first and second planes, respectively; a thin metallic film electrically connecting said elongate limbs and lying in said second plane with one edge of said film lying in said first plane; a block of conductive and substantially nonmagnetic material including a recess, said conductive limbs being electrically insulated from said block and inserted into the recess thereof, said block having first and second faces lying in said first and second planes, respectively; an electrically conductive path looping together those ends of the limbs remote from said first plane; a structure of high magnetic permeability forming a closed magnetic circuit coupled to said conductive path, and a winding closely magnetically coupled to said structure.

2. A magnetic head as claimed in claim 1 in which said elongate limbs are thin layers of conductive material and including a thin layer of electrically insulating material positioned between said thin layers of conductive material over a greater part of the length of said layers of conductive material with one end of said insulating layer lying in said first plane.

3. A magnetic head as claimed in claim 1 including a ferrite member positioned in contact with said conductive block and said thin metallic film, said ferrite member having one side lying in said second plane.

4. A magnetic head as claimed in claim 3 including a strip of electrically conductive material positioned between said elongate limbs to reduce the spacing therebetween, said strip being positioned along a portion of the limb remote from the end of said limb lying in said first plane.